US012039084B2

(12) United States Patent
Richards et al.

(10) Patent No.: US 12,039,084 B2
(45) Date of Patent: *Jul. 16, 2024

(54) SYSTEMS AND METHODS FOR DETECTING AND REMEDYING THEFT OF DATA

(71) Applicant: GroupSense, Inc., Arlington, VA (US)

(72) Inventors: Thomas Stephen Richards, Arlington, VA (US); Collin Cameron Meadows, Arlington, VA (US); Kyle Allen Gochenour, Arlington, VA (US)

(73) Assignee: GROUPSENSE, INC., Arlington, VA (US)

( * ) Notice: Subject to any disclaimer, the term of this patent is extended or adjusted under 35 U.S.C. 154(b) by 481 days.

This patent is subject to a terminal disclaimer.

(21) Appl. No.: 16/836,792

(22) Filed: Mar. 31, 2020

(65) Prior Publication Data

US 2020/0226291 A1    Jul. 16, 2020

Related U.S. Application Data

(63) Continuation of application No. 15/970,874, filed on May 4, 2018, now Pat. No. 10,614,250.

(51) Int. Cl.
*G06F 21/62* (2013.01)
*H04L 9/06* (2006.01)
*H04L 9/40* (2022.01)

(52) U.S. Cl.
CPC ...... *G06F 21/6263* (2013.01); *G06F 21/6227* (2013.01); *H04L 9/0643* (2013.01); *H04L 63/1425* (2013.01)

(58) Field of Classification Search
CPC ............... G06F 21/554; G06F 21/6263; G06F 21/6227; G06F 17/30864; G06F 17/30091; H04L 63/14; H04L 63/1416; H04L 63/1425
See application file for complete search history.

(56) References Cited

U.S. PATENT DOCUMENTS

| 9,118,689 | B1 * | 8/2015 | Apte | H04L 63/08 |
| 9,614,826 | B1 * | 4/2017 | McCorkendale | H04L 63/08 |
| 10,198,322 | B2 * | 2/2019 | Manjunath | G06F 11/1464 |
| 10,558,817 | B2 * | 2/2020 | Goel | G06F 16/22 |

(Continued)

*Primary Examiner* — Linglan Edwards
(74) *Attorney, Agent, or Firm* — ROCK IP, PLLC

(57) ABSTRACT

The present disclosure relates to systems and methods for information security, specifically for automatically detecting theft of personal data. In one implementation, a computer-implemented method for automatically detecting theft of personal data on the Internet may include at least one processor configured to execute instructions, the instructions including receiving from a user, an electronic communication containing a first search term, extracting via pattern recognition one or more patterns corresponding with the first search term, and comparing the one or more patterns with a subset of data scraped from the Internet, with the subset of data scraped from the Internet being indexed by pattern for the first search term. The instructions may also include flagging matches of the one or more patterns with the subset of data based on the comparison and transmitting information associated with the matches in a report that indicates a possible theft of personal data.

18 Claims, 5 Drawing Sheets

(56) References Cited

U.S. PATENT DOCUMENTS

| | | | | |
|---|---|---|---|---|
| 10,979,461 | B1* | 4/2021 | Cervantez | H04L 63/105 |
| 2007/0115986 | A1* | 5/2007 | Shankara | H04L 63/145 |
| | | | | 370/392 |
| 2013/0333048 | A1* | 12/2013 | Coggeshall | H04L 63/12 |
| | | | | 726/26 |
| 2015/0215325 | A1* | 7/2015 | Ogawa | G06F 16/951 |
| | | | | 726/23 |
| 2016/0180088 | A1* | 6/2016 | Zhang | H04L 63/1416 |
| | | | | 726/23 |
| 2017/0078321 | A1* | 3/2017 | Maylor | H04L 63/08 |
| 2019/0132337 | A1* | 5/2019 | Park | G06F 21/6263 |
| 2019/0166153 | A1* | 5/2019 | Steele | H04L 63/1441 |

* cited by examiner

SYSTEMS AND METHODS FOR DETECTING AND REMEDYING THEFT OF DATA

TECHNICAL FIELD

The present disclosure relates to systems and methods for information security. More specifically, and without limitation, the present disclosure relates to systems and methods for automatically detecting theft of personal data across networks such as, for example, the surface web, deep web, I2P network, and Darknet.

BACKGROUND

A substantial portion of personal data theft, such as names, addresses, credit card information, social security numbers, bank account information, and the like, now occurs on the Internet. For example, stolen credit card numbers are frequently bought and sold on forums, chat rooms, and other collaborative tools on the dark web. Detecting the theft of personal data and tracking its exchange across the Internet presents a significant technological challenge. For example, it is resource intensive to crawl and scrape the vast amounts of data on the Internet, and it is also resource intensive to cull through the vast amounts of crawled and scraped data.

Another drawback of existing techniques is managing the privacy of the personal data for which the theft is being detected. For example, many users must either transmit their personal data in plain-text format, without any encryption or hashing, to the detection company or software and/or trust that the detection company or software will cryptographically hash such data upon receipt and destroy the unencrypted plain-text copy. On the other hand, if users were to transmit cryptographically hashed personal data directly to the detection company of software, the resource requirement for culling often begins to scale exponentially due to the necessity of cryptographically hashing the scraped data in order to perform the comparison.

Accordingly, there is a need for improved techniques for detecting the theft of personal data across the Internet.

SUMMARY

Embodiments consistent with the present disclosure provide systems and methods that automatically detect theft of personal data. The disclosed systems and methods may increase efficiency over existing techniques, generate more substantive detection reports than existing techniques, and allow for greater privacy controls than existing techniques.

There are many possible applications for such capabilities. For example, organizations that cannot afford traditional data theft monitoring may benefit from the disclosed systems and methods. In addition, the disclosed systems and methods may allow for more secure detection of data theft.

In one embodiment, a computer-implemented method for automatically detecting theft of personal data on the Internet may execute instructions on a processor. The instructions may comprise instructions for receiving from a user, an electronic communication containing a first search term; extracting via pattern recognition, one or more patterns corresponding with the first search term; comparing the one or more patterns with a subset of data scraped from the Internet, the subset of data scraped from the Internet being indexed by pattern for the first search term; flagging one or more matches of the one or more patterns with the subset of data based on the comparison; and transmitting information associated with the one or more matches in a report indicating a possible theft of personal data. In yet another embodiment, the computer-implemented method further comprises instructions for cryptographically hashing the first search term and the extracted subsets of data and comparing the one or more patterns includes comparing the cryptographically hashed subsets to the cryptographically hashed first search term. In yet another embodiment, the received search term is cryptographically hashed and the instructions further include cryptographically hashing the extracted subsets of data and comparing the one or more patterns includes comparing the cryptographically hashed subsets to the cryptographically hashed first search term. In yet another embodiment, the computer-implemented method further comprises instructions for obtaining one or more DNS records related to the at least one source and the generated report is further based on the one or more records. In yet another embodiment, the computer-implemented method further comprises instructions for generating a plurality of variations of the search term using one or more fuzzy algorithms and comparing the one or more patterns includes comparing the cryptographically hashed subsets to the plurality of variations. In yet another embodiment, the computer-implemented method further comprises instructions for causing a takedown service to be initiated in response to the one or matches in the report.

In yet another embodiment, a system for automatically detecting theft of personal data on the Internet comprises a non-transitory memory and one or more processors coupled to the non-transitory memory and configured to execute instructions to perform operations, comprising receiving from a user, an electronic communication containing a first search term; extracting via pattern recognition, one or more patterns corresponding with the first search term; comparing the one or more patterns with a subset of data scraped from the Internet, the subset of data scraped from the Internet being indexed by pattern for the first search term; flagging one or more matches of the one or more patterns with the subset of data based on the comparison; and transmitting information associated with the one or more matches in a report indicating a possible theft of personal data. In yet another embodiment, the instructions may further comprise cryptographically hashing the first search term and the extracted subsets of data and comparing the one or more patterns includes comparing the cryptographically hashed subsets to the cryptographically hashed first term. In yet another embodiment, the received search term is cryptographically hashed and the instructions further comprise cryptographically hashing the extracted subsets of data and comparing the one or more patterns includes comparing the cryptographically hashed subsets to the cryptographically hashed first search term. In yet another embodiment, a potential impact level may be determined based on the report. In yet another embodiment, the potential impact level is determined based on a weighted sum of factors. In yet another embodiment, the factors include the accuracy of the determination, the type of personal information detected, and the location of detection on the internet. In yet another embodiment, a message is transmitted in response to the report, the message causing a takedown service to be initiated. In yet another embodiment, the instructions further comprise generating a plurality of variations of the search term using one or more fuzzy algorithms.

In yet another embodiment, a non-transitory computer readable storage media stores instructions for automatically detecting theft of personal data, the instructions comprising receiving from a user, an electronic communication containing a first search term; extracting via pattern recognition, one or more patterns corresponding with the first search term; comparing the one or more patterns with a subset of data scraped from the Internet, the subset of data scraped from the Internet being indexed by pattern for the first search term; flagging one or more matches of the one or more patterns with the subset of data based on the comparison; and transmitting information associated with the one or more matches in a report indicating a possible theft of personal data. In yet another embodiment, the instructions further comprise cryptographically hashing the first search term and the extracted subsets of data and comparing the one or more patterns includes comparing the cryptographically hashed subsets to the cryptographically hashed first term. In yet another embodiment, the instructions further comprise determining a potential impact level in response to the report based on a weighted sum of factors. In yet another embodiment, the instructions further comprise transmitting a message in response to the potential impact level exceeding a threshold, the message causing a takedown service to be initiated. In yet another embodiment, the instructions further comprise generating a plurality of variations of the search term using one or more fuzzy algorithms. In yet another embodiment, comparing the one or more patterns includes comparing the cryptographically hashed subsets to the plurality of variations.

In some embodiments, a search term may comprise some or all of the personal data (e.g., names, addresses, credit card information, social security numbers, bank account information, etc.). A pattern may include a particular length (e.g., U.S. social security numbers comprise nine digits, Romanian personal identity numbers comprise thirteen digits, etc.), a particular format (e.g., phone numbers in the North American Numbering Plan comprise a three-digit area code, followed by a three-digit central office prefix, followed by a four-digit subscriber number; national identification numbers in the Republic of China comprise one letter followed by nine digits; etc.), or the like. The instructions may further comprise instructions to scrape data from at least one source accessible via the Internet. Scraping data may comprise any known method for scraping data from the Internet.

Consistent with other disclosed embodiments, non-transitory computer readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

Figure 1:
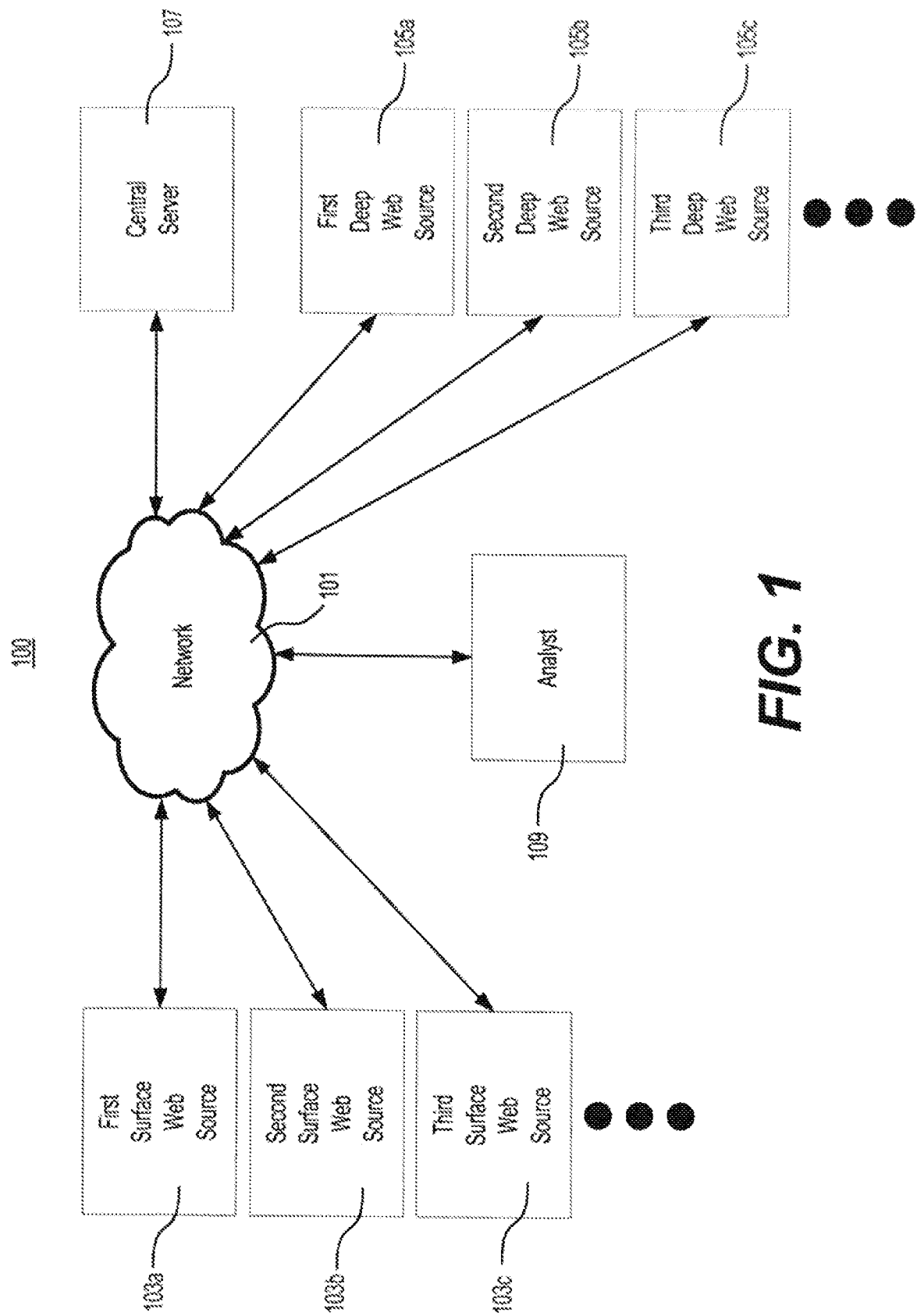
FIG. 1 is a depiction of an exemplary system consistent with one or more disclosed embodiments of the present disclosure.

The following detailed description refers to the accompanying drawings. While several illustrative embodiments are described herein, modifications, adaptations, and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The disclosed embodiments relate to systems and methods for automatically detecting theft of personal data. Embodiments of the present disclosure may be implemented using a general-purpose computer. Alternatively, a special-purpose computer may be built using suitable logic elements.

Embodiments of the present disclosure may provide less resource-intensive techniques than traditional algorithms and may provide more detailed reports than traditional algorithms.

To detect theft of personal data, a system may scrape information from the Internet. For example, a crawler may index the surface web, and a scraper may then obtain data based on the index. For websites that employ anti-crawling technology and/or websites on the deep web, the system may employ other techniques, for example, Sitemaps or mod_oia, and/or supplement the automatic crawler with human intervention.

To obtain data included on one or more virtual private networks (VPNs), the system may employ a VPN proxy configured to access the VPN. Similarly, to obtain data on the dark web, the system may employ a Tor proxy or other dark web proxy to access the hidden websites. In some embodiments, e.g., embodiments including Tor proxy, the system may employ seeded crawling to crawl and scrape hidden websites.

The system may further supplement the scraped data with data obtained from one or more application programming interface (API) harvesters configured to obtain data published on OAI-PMH, OpenSearch, SRU, RSS, other standardized publication APIs, or custom-built APIs. Other open data sources (for example, whois records or mail exchanger (MX) records) may be used to supplement the scraped data. Furthermore, analytics regarding the source (e.g., Google analytics) may be used to supplement the scraped data.

In addition to the scraped data, the system may obtain metadata, markup language (ML) data, secure sockets layer (SSL) data, and/or the like associated with the scraped data. The system may also associate a portion of the scraped data with one or more other portions of the scraped data based on one or more relationships between the portions (e.g., the portions are derived from the same source, the portions contain significant overlapping in data, or the like).

The system may store the scraped data and may also store any supplemental data (e.g., API harvester data, whois data, analytic data, ML data, or other supplemental data discussed above) with the scraped data. In some embodiments, the system may extract one or more patterns from the scraped data and/or supplemental data. In one example, the system may detect one or more patterns based on length (e.g., District of Columbia driver's licenses comprise seven digits, South African identification numbers comprise thirteen digits, etc.), based on format (e.g., Bahraini person numbers comprise two digits indicating the year of birth, followed by two digits indicating the month of birth, followed by four random digits, followed by a check digit; New Zealander national health index numbers comprise three letters and four digits with the fourth character being a check digit; etc.), or the like, or a combination thereof.

By indexing the scraped and/or supplemental data with pattern extraction, the system may exponentially reduce search time within the scraped and/or supplemental data. For example, if the system searches for a specific credit card number, the system may search only the indexed portions of the data based on the pattern extraction. In this example, the system may have indexed data as credit card data based on length (e.g., Visa, Mastercard, and Discover use 16 digit credit card numbers and American Express uses 15 digit credit card numbers) and/or based on format (e.g., the Primary Account Number (PAN) standard (ISO/IEC 7812) comprises a six-digit Issuer Identification Number (IIN) (including the Major Industry Identifier (MII) as the first digit), followed by an account number of up to 12 digits, followed by a single check digit using the Luhn algorithm). Accordingly, in this example, the system searches for the specific credit card number only against scraped data indexed as an extracted credit card pattern.

In some embodiments, the system may also cryptographically hash the extracted patterns. For example, the system may cryptographically hash the patterns using one or more known hashing algorithms, such as MD5, SHA-1, SHA-224, SHA-256, SHA-384, SHA-512, SHA3-224, SHA3-256, SHA3-384, SHA3-512, any other appropriate cryptographic hashing algorithm, or the like or, any combination thereof. In such embodiments, the system may search for cryptographically hashed data among the indexed data. Accordingly, this may retain the efficiency gains from the index yet still permit for privacy in receiving data for which to search. Some advantages of disclosed embodiments may include faster processing from more efficient index and greater system security.

Upon finding a match within the indexed and/or scraped data, the system may generate a report summarizing the finding. Such a report may be based on the match itself as well as supplemental data associated with the finding. For example, the report may indicate a location on the Internet where the match was found. The report may further include whois data, analytic data, ML data, or the like related to the source of the matching data. Such supplemental data may, for example, provide an analyst receiving the report with more information for determining one or more prescriptive suggestions. For example, a source with matching data may be more suspicious if the ML data indicates one or more email addresses associated with the source. Similarly, a source with matching data may be more suspicious if the whois data contains a fake mailing address, email address, phone number, name, or the like or, a combination thereof.

The aforementioned techniques for detection may be used with one or more of the disclosed systems below and/or with one or more of the disclosed methods below.

FIG. 1 is a depiction of an exemplary system 100 for automatically detecting theft of personal data. As depicted in FIG. 1, system 100 may comprise a network 101, a plurality of surface web sources, e.g., source 103*a*, source 103*b*, and source 103*c*, a plurality of deep web sources, e.g., source 105*a*, source 105*b*, and source 105*c*, a central server 107, and an analyst 109. Other embodiments of system 100 may have different structure and/or components than depicted in FIG. 1. For example, system 100 may include additional servers—for example, central server 105 may comprise multiple servers and/or one or more sources may be stored on one or more servers. In this example, one or more sources may be distributed over a plurality of servers, and/or one or more sources may be stored on the same server.

Network 101 may be any type of network that provides communication and/or facilitates exchanging of information between two or more nodes/terminals. For example, network 101 may comprise the Internet; a Local Area Network (LAN) using Ethernet, token ring, etc.; a wide area network (WAN); or other suitable telecommunications network. In some embodiments, one or more nodes of system 100 may communicate with one or more additional nodes via a dedicated (and/or private) communications medium.

Figure 2:
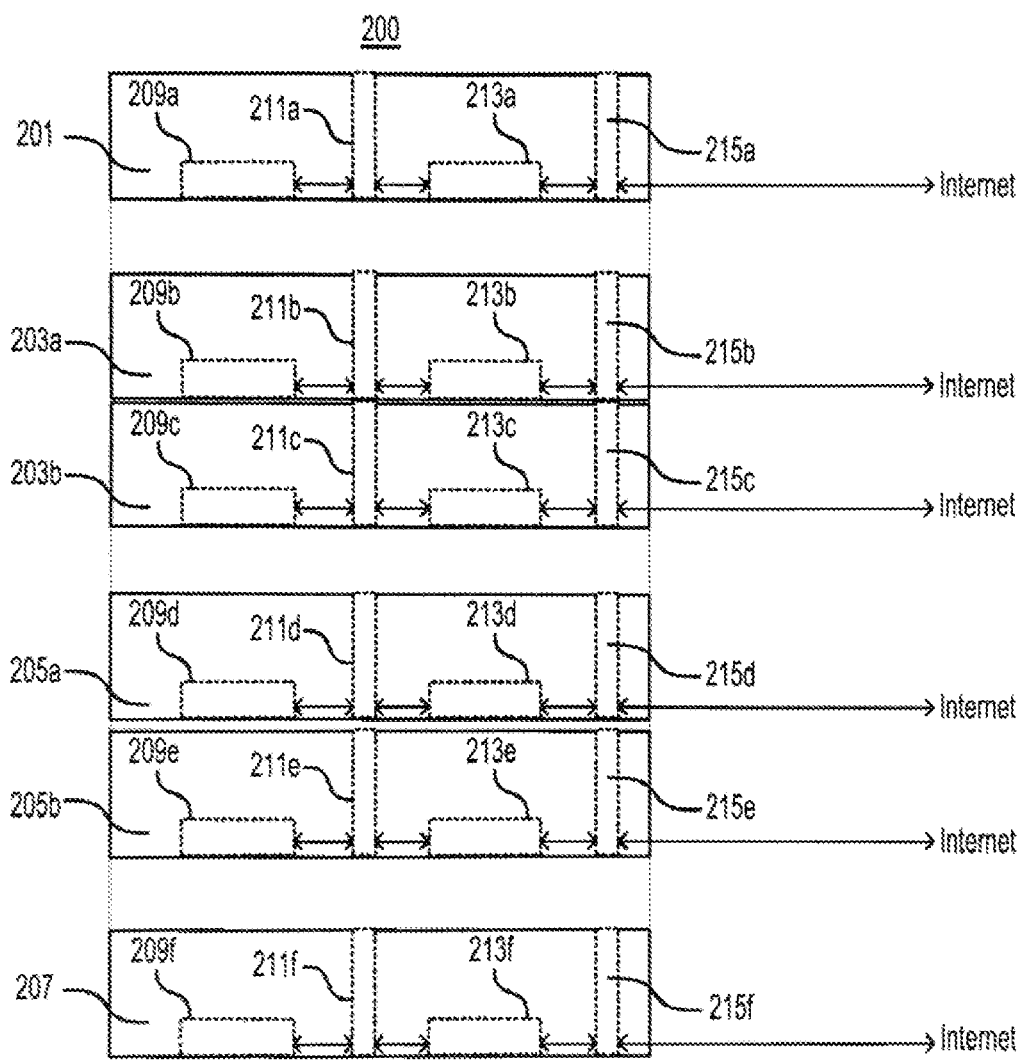
FIG. 2 is a depiction of an exemplary server rack for use in the exemplary system of FIG. 1.

Central server 107 may comprise a single server or a plurality of servers. In some embodiments, the plurality of servers may be connected to form one or more server racks, e.g., as depicted in FIG. 2. Moreover, the plurality of servers may be housed on a server farm. In some embodiments, central server 107 may store instructions to perform one or more operations of the disclosed embodiments on one or more memory devices. Further, in some embodiments, central server 107 may comprise one or more processors (e.g., CPUs, GPUs, or the like) for performing stored instructions. In some embodiments, central server 107 may send information to and/or receive information from analyst 109 through network 101.

In some embodiments, surface sources 103*a*, 103*b*, and 103*c* may comprise one or more websites indexed by a traditional search engine (e.g., Google, Yahoo, Altavista, or the like). As further depicted in FIG. 1, deep web sources 105*a*, 105*b*, and 105*c* may comprise one or more websites not indexed by a search engine. For example, one or more deep web sources may comprise websites that were not indexed on account of obscurity. One or more deep web sources may also comprise websites that were hidden intentionally, for example, web mail, online banking, paywall content, and the like, yet remain obtainable via a traditional web browser (e.g., Netscape navigator, Internet explorer, Google Chrome, Mozilla Firefox, or the like). Alternatively, or concurrently, one or more deep web sources may also comprise dark web sources—that is, one or more websites not obtainable via a traditional web browser. For example, one or more dark web sources may comprise content accessible via friend-to-friend networks or peer-to-peer networks, websites accessible on networks like Tor, Freenet, or I2P, or the like.

In some embodiments, central server 107 may receive information from one or more of the plurality of surface web sources, e.g., sources 103*a*, 103*b*, and 103*c*. For example, central server 107 may perform web crawling and/or scraping to receive information from the surface sources. A web crawler may be configured to find, index, and/or fetch web pages and documents on the surface sources. A web scraper may be configured to copy crawled data to central server 107 or may be configured to process crawled data and copy the processed data to central server 107. For example, the scraper may parse, search, reformat, etc., crawled data before copying.

In some embodiments, central server 107 may receive information from one or more of the plurality of deep web sources, e.g., sources 105*a*, 105*b*, and 105*c*. For example, central server 107 may perform seeded crawling while using and maintaining a database of known deep web sources for scraping (or for performing other deep crawling techniques to retrieve information) from the deep web sources. The scraper may copy crawled data to central server 107 or may process crawled data and copy the processed data to central server 107.

The surface scraper and/or deep scraper may run continuously, near continuously, periodically at scheduled collection intervals (e.g., every hour, every five minutes, etc.), or on-demand based on a request (e.g., when analyst 109 requests a report).

In some embodiments, manual operators may supplement the processes performed by the web scraper. For example, a manual operator may assist with indexing one or more web pages that employ anti-crawling technology or with seeding the crawler and/or updating the database for use in deep crawling.

Analyst 109 may connect to network 101 by using one or more devices with an operable connection to network 101. For example, analyst 109 may use a laptop computer, desktop computer, smartphone, tablet, or the like, to access network 101.

In some embodiments, central server 107 may receive at least one search term via network 101, for example, from analyst 109 or from another user of network 101. For example, the at least one search term includes a mailing address, the server may generate all variations corresponding to variations of the mailing address approved by a post office authority (e.g., the U.S. Postal Service, the State Post Bureau of the People's Republic of China, etc.). By way of further example, if the at least one search term includes a phone number, the server may generate all variations corresponding to variations of the phone number approved by a numbering administration (e.g., the U.S. Federal Communications Commission, the Canadian Numbering Administration Consortium, etc.).

FIG. 2 is a depiction of an exemplary server rack 200 for use in system 100 of FIG. 1. As depicted in FIG. 2, server rack 200 may comprise a management/control server 201, one or more compute servers, e.g., servers 203a and 203b, one or more storage servers, e.g., servers 205a and 205b, and spare server 207. Other embodiments of system 200 may have a different structure and/or components than depicted in FIG. 1. For example, system 200 may function without spare server 207. By way of further example, one or more of the compute servers may be integrated with one or more of the storage servers.

In some embodiments, one or more servers of server rack 200 may comprise one or more memories. For example, as depicted in FIG. 2, management/control server 201 comprises memory 209a, compute server 203a comprises memory 209b, compute server 203b comprises memory 209c, storage server 205a comprises memory 209d, storage server 205b comprises memory 209e, and spare server 207 comprises memory 209f. As used herein, the term "memory" may refer to a traditional RAM, e.g., SRAM or DRAM, or other suitable computer data storage. The one or more memories may store instructions to perform one or more operations of the disclosed embodiments and/or may store scraped data. As depicted in FIG. 2, the one or more memories in a server may be operably connected to one or more processors (and/or to one or more non-volatile memories and/or to one or more network interfaces) in the same server.

In some embodiments, one or more servers of server rack 200 may further comprise one or more processors. For example, as depicted in FIG. 2, management/control server 201 comprises processor 211a, compute server 203a comprises processor 211b, compute server 203b comprises processor 211c, storage server 205a comprises processor 211d, storage server 205b comprises processor 211e, and spare server 207 comprises processor 211f. As used herein, the term "processor" may refer to a traditional CPU, e.g., an Intel®, AMD®, or Sun® CPU, a traditional GPU, e.g., an NVIDIA® or ATI® GPU, or other suitable processing device. As depicted in FIG. 2, the one or more processors in a server may be operably connected to the one or more memories (and/or to one or more non-volatile memories and/or to one or more network interfaces) in the same server.

In some embodiments, one or more servers of server rack 200 may further comprise one or more non-volatile memories. For example, as depicted in FIG. 2, management/control server 201 comprises non-volatile memory 213a, compute server 203a comprises non-volatile memory 213b, compute server 203b comprises non-volatile memory 213c, storage server 205a comprises non-volatile memory 213d, storage server 205b comprises non-volatile memory 213e, and spare server 207 comprises non-volatile memory 213f. As used herein, the term "non-volatile memory" may refer to a traditional disk drive, e.g., a hard disk drive or DVD drive, an NVRAM, e.g., flash memory, or other suitable non-volatile computer data storage. The one or more non-volatile memories may store instructions to perform one or more operations of the disclosed embodiments and/or scraped data. As depicted in FIG. 2, the one or more non-volatile memories in a server may be operably connected to the one or more processors (and/or to the one or more memories and/or to one or more network interfaces) in the same server.

In some embodiments, one or more servers of server rack 200 may further comprise one or more network interfaces. For example, as depicted in FIG. 2, management/control server 201 comprises network interface 215a, compute server 203a comprises network interface 215b, compute server 203b comprises network interface 215c, storage server 205a comprises network interface 215d, storage server 205b comprises network interface 215e, and spare server 207 comprises network interface 215f. As used herein, the term "network interface" may refer to a network interface card (MC) configured to use a known data link layer standard, such as Ethernet, Wi-Fi, Fibre Channel, or Token Ring, or other suitable network interface. As depicted in FIG. 2, one or more NICs in server rack 200 may be operably connected to the Internet. In other embodiments, one or more NICs in server rack 200 may be operably connected to a LAN, a WAN, or any other communication network.

In some embodiments, the one or more network interfaces may permit the one or more servers to execute instructions remotely and to access information from the plurality of sources. As further depicted in FIG. 2, the one or more network interfaces in a server may be operably connected to the one or more non-volatile memories (and/or to the one or more processors and/or to the one or more memories) in the same server.

As explained above, server rack 200 need not include all components depicted in FIG. 2. Additionally, server rack 200 may include additional components not depicted in FIG. 2, e.g., a backup server or a landing server.

Figure 3:
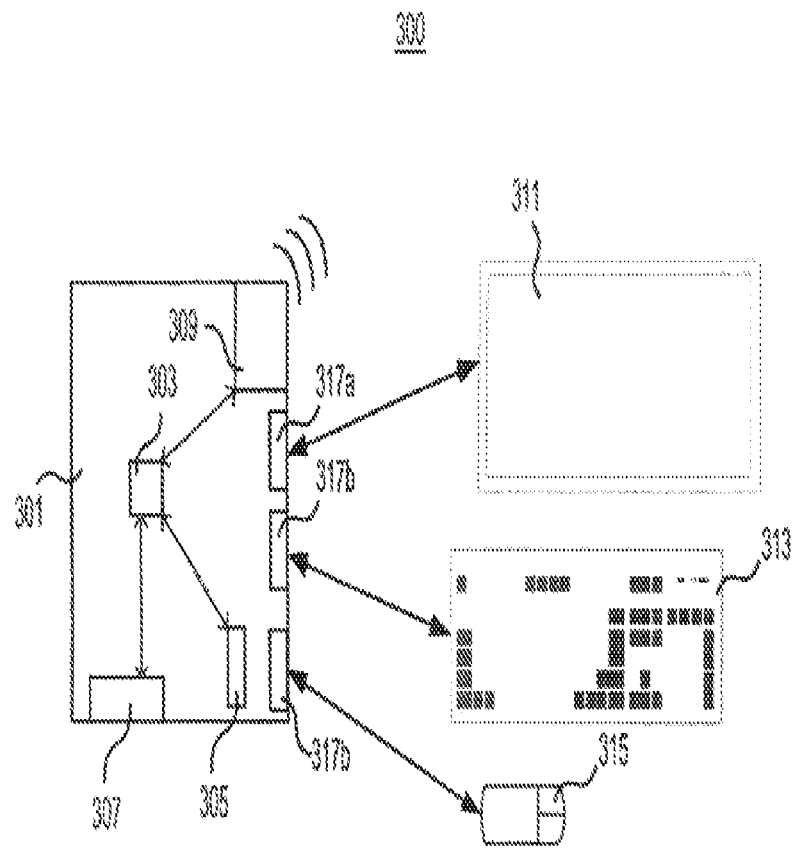
FIG. 3 is a depiction of an example server for use in the exemplary system of FIG. 1.

FIG. 3 is a depiction of example server 300 for use in system 100 of FIG. 1 (e.g., as central server 107). As depicted in FIG. 3, server 300 may comprise a motherboard 301 having a processor 303, one or more memories, e.g., memory 305, one or more non-volatile memories, e.g., non-volatile memory 307, and a network interface card (MC) 309. As further depicted in FIG. 3, NIC 309 may be wireless (e.g., NIC 309 may be configured to utilize Wi-Fi, Bluetooth, 4G, etc.). In other embodiments, NIC 309 may be wired (e.g., NIC 309 may be configured to utilize Ethernet, Token Ring, etc.).

In some embodiments, server 300 may further comprise one or more display modules, e.g., display 311. For example, display 311 may comprise an LCD screen, an LED screen, or any other screen capable of displaying text and/or graphic content. In some embodiments, display 311 may comprise a touchscreen that uses any suitable sensing technology, e.g., resistive, capacitive, infrared, etc. In such embodiments, display 311 may function as an input device in addition to an output device.

In some embodiments, server 300 may further comprise one or more user input devices, e.g., keyboard 313 and/or mouse 315. As further depicted in FIG. 3, the one or more display modules and one or more user input devices may be operably connected to motherboard 301 using hardware ports, e.g., ports 317a, 317b, and 317c. As used herein, the term "hardware port" may refer to a PS/2 port, a DVI port, an eSata port, a VGI port, an HDMI port, a USB port, or the like.

Server 300 need not include all components depicted in FIG. 3, e.g., display 311 may be omitted. Additionally, server 300 may include additional components not depicted in FIG. 3, e.g., external disc drives, graphics cards, etc.

Figure 4:
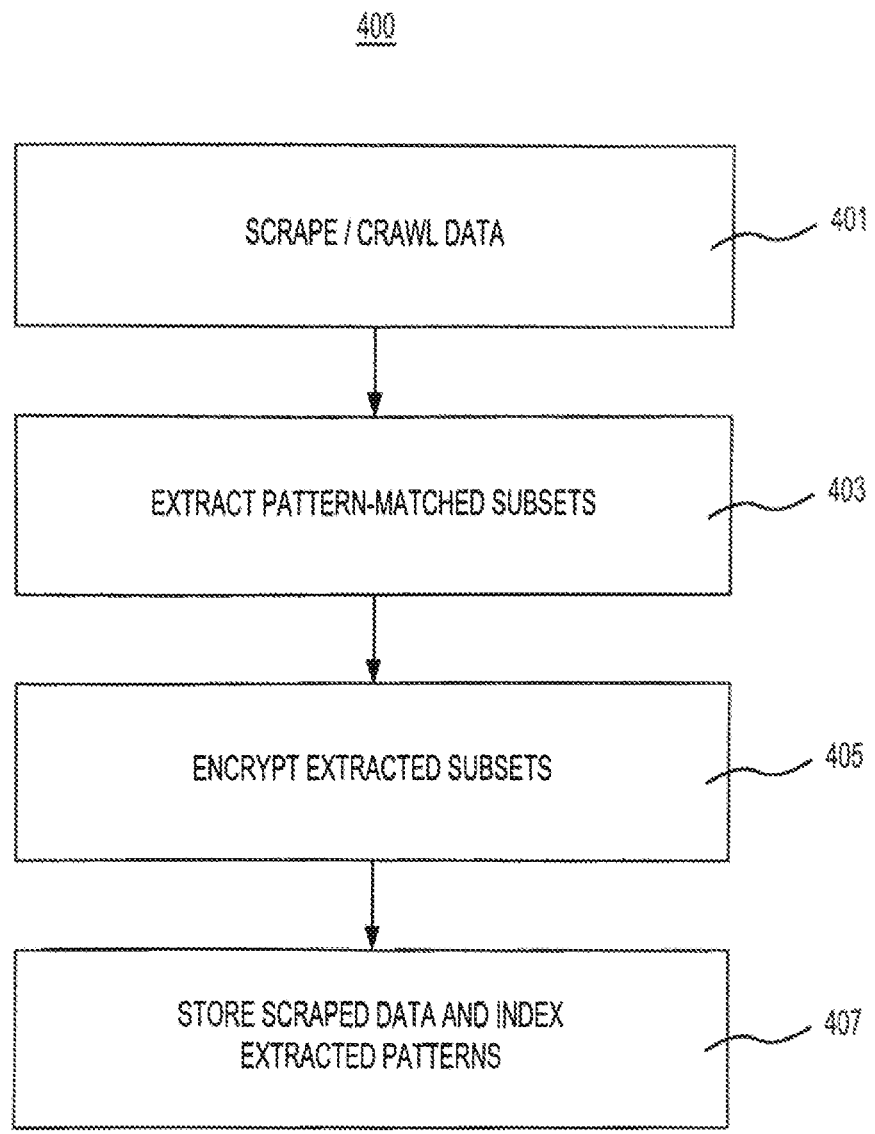
FIG. 4 is a flowchart of an exemplary method for automatically detecting theft of personal data.

FIG. 4 is a flowchart of exemplary method 400 for automatically detecting theft of personal data. Method 400 may, for example, be executed by central server 107 of FIG. 1 or any other appropriate hardware and/or software. In some embodiments, one or more processes 401-407 may be implemented, at least in part, in the form of executable code stored on non-transitory, tangible, computer readable media that when run by one or more processors, may cause the one or more processors to perform one or more of processes 401-407.

At step 401, the server may crawl and/or scrape data from the Internet. For example, the server may employ one or more known crawling and/or scraping techniques, as described above, to scrape data from surface web sources and/or from deep web sources.

In certain aspects, the server may also obtain supplemental data related to the scraped data. For example, the server may obtain one or more DNS records related to the source(s) of the scraped data. By way of further example, the server may obtain metadata related to the source(s) of the scraped data. The server may also obtain other supplemental data, as described above.

At step 403, the server may extract one or more subsets of data from the scraped data corresponding to one or more patterns. For example, the server may extract data corresponding to one or more known patterns for bank account numbers, one or more known patterns for passport numbers, one or more known patterns for names, one or more known patterns for mailing addresses, or the like, or a combination thereof. In some embodiments, the server may also index the scraped data (either with or without related supplemental data) by pattern.

At step 405, the server may cryptographically hash the extracted subsets. For example, the server may hash the extracted subsets using one or more known hashing algorithms, as described above. The server may cryptographically hash some of the extracted subsets or all of the extracted subsets. In some embodiments, the server may also store the cryptographically hashed subsets (e.g., with the scraped data).

At step 407, the server may store the extracted subsets. For example, the server may store the extracted subsets indexed by pattern. In some embodiments, the server may also store the scraped data and/or the supplemental data. In such embodiments, the scraped data and/or the supplemental data may be indexed by the extracted subsets.

Figure 5:
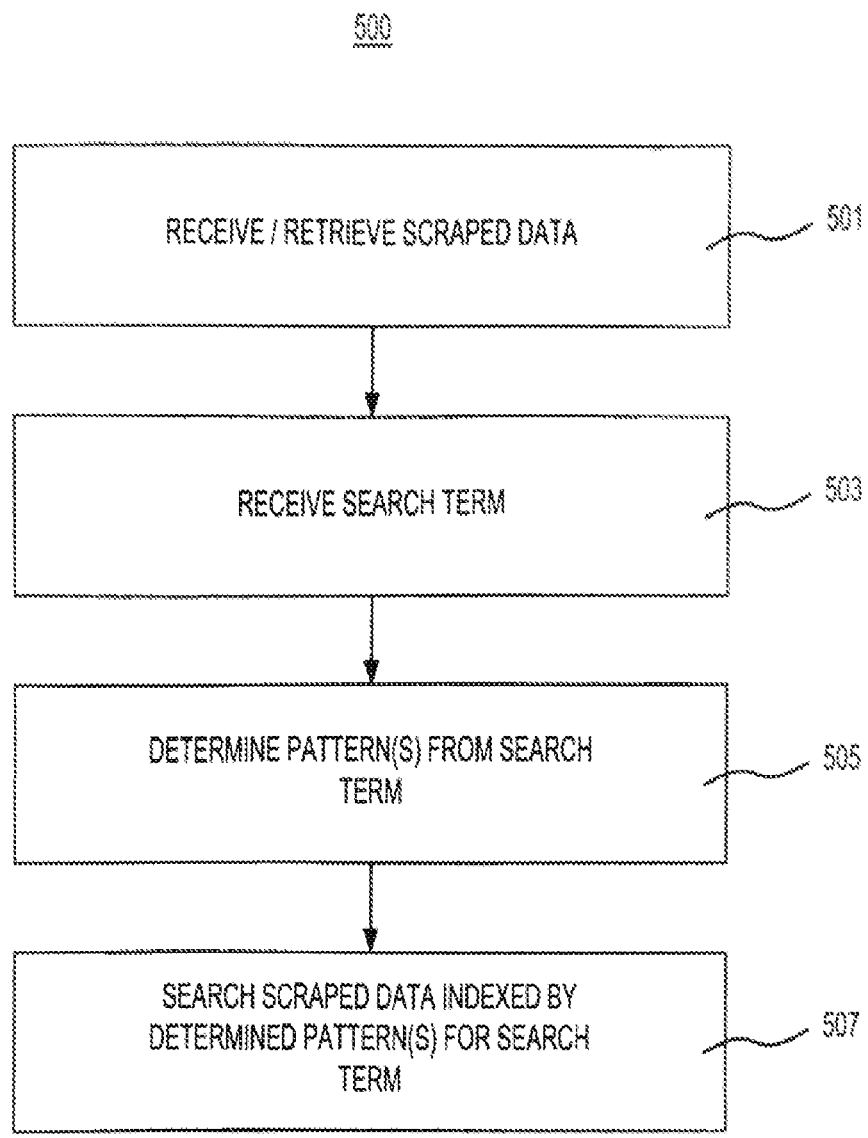
FIG. 5 is a flowchart of an exemplary method for automatically detecting theft of personal data.

FIG. 5 is a flowchart of exemplary method 500 for automatically detecting theft of personal data. Method 500 may, for example, be executed by central server 107 of FIG. 1 or any other appropriate hardware and/or software. In some embodiments, one or more processes 501-507 may be implemented, at least in part, in the form of executable code stored on non-transitory, tangible, computer readable media that when run by one or more processors, may cause the one or more processors to perform one or more of processes 501-507.

At step 501, the server may receive and/or retrieve scraped data. For example, the server may retrieve scraped data from one or more storage devices. Alternatively, or concurrently, the server may obtain scraped data using, for example, method 400.

In certain aspects, the scraped data may be indexed by pattern. Moreover, the scraped data may also include supplemental data (such as DNS records, metadata, or the like, as described above), which may be indexed by pattern. Alternatively, or concurrently, the server may retrieve supplemental data after receipt of the scraped data.

In certain aspects, the server may cryptographically hash at least a portion of the scraped data. Alternatively, or concurrently, at least a portion of the received scraped data may be cryptographically hashed.

At step 503, the server may receive at least one search term. For example, the server may receive the at least one search term from a user. Alternatively, or concurrently, the server may receive the at least one search term from an analyst associated with the user.

In certain aspects, the server may also generate a plurality of variations of the at least one search term using one or more fuzzy algorithms. Alternatively, or concurrently, the at least one search term may correspond with the at least one search term discussed above with respect to FIG. 1.

In certain aspects, the server may cryptographically hash the at least one search term. In embodiments where a plurality of variations have been generated, the server may cryptographically hash the variations as well. Alternatively, or concurrently, the server may receive an already-encrypted search term.

At step 505, the server may determine one or more patterns corresponding to the at least one search term. For example, as described above, the server may determine that the at least one search represents a credit card number, social security number, mailing address, name, or the like based on pattern recognition.

At step 507, the server may search the scraped data indexed by pattern for the at least one search term. In embodiments where a search term is cryptographically hashed, the server may compare the cryptographically hashed search term with cryptographically hashed scraped data. In embodiments where a plurality of variations have been generated, the server may also compare each of the variations with the scraped data.

Because the scraped data is indexed by pattern, the server may compare only portions of the scraped data indexed to one or more patterns matching the determined one or more patterns. Some advantages of disclosed embodiments include reduced processing time for searches.

Method 500 may further include additional steps. In some embodiments, when a match is detected, each match may be flagged and stored. Alternatively, or concurrently, information associated with the match may be stored with each match, including source, e.g., web address, IP address, DNS records, etc., or other data associated with the search term, scraped data, or the like. The generated report may be based on the source or other data associated with the search term, scraped data, or the like.

For example, method 500 may further include generating a report indicating that the matched data may represent a theft of personal data. In embodiments having supplemental data, the report may further include supplemental data related to the match, e.g., search information. By way of further example, method 500 may further include transmitting the report to at least one of a user or an analyst associated with the user, a government agency, a private security organization, or the like.

In some embodiments, a report may be generated with an impact evaluation included in the report. Because different types of personal data may be detected in different ways, and different types of personal data may be detected in different places, a potential impact level may be determined, for instance, on a scale of 1-100. A potential impact level may be equal to a weighted sum of various factors, including the accuracy of the determination, type of personal information detected, location of detection on the internet, physical location of a user, and/or the like and/or a combination thereof. If the potential impact level exceeds a certain level (e.g., 60 out of 100), it may be determined that the theft of personal data is actionable and/or malicious. In one example, using method 500, it may be determined with near 100% certainty that an email address is detected and that the email address belongs to a CEO. If a match is located including a CEO's email address, but the CEO's email address appeared in the context of a press release, for example, the item may not be actionable, and the potential impact level would be weighted low. However, if the press release appeared on the dark web along with malicious comments, plans, or other valuable or vulnerable data, it would be considered actionable.

In some embodiments, a report may include data about the detection of personal data, including user preferences, hashed data, unhashed data, appropriate hashing and unhashing algorithms, potential risks, potential precautionary steps and remedial steps to take in response. In some examples, a response to the detection may be automated.

In some embodiments, a report including detection of personal data may automatically trigger one or more programmed responses. For example, if the hashed data includes login credentials, the credentials may be automatically reset or access to an account may be blocked and may be pending further action by an administrator (as well as sending email or other alerts). In some examples, financial account history, such as a credit card, may be monitored or financial accounts cancelled. In some examples, new credentials requested or granted. In one example, based on the located data, surrounding data, and context, it can be determined that domain names and/or URLs are being used for improper purposes such as cybersquatting or phishing, such as phishing for customer information and credentials.

In some embodiments, a takedown service may be initiated. In some examples, a takedown service may be initiated in response to a report of theft of personal information. In some examples, the takedown service may be initiated in response to the report and a determination that the potential impact level exceeds a threshold. A takedown may be implemented manually or automatically, e.g., by notifying browser companies of the dangerous URL so that the browsers will automatically block access and/or warn users that the URL is associated with potentially malicious activity. In some examples, the takedown service may include manually or automatically filing DMCA complaints and/or interact with domain name registrars or web-hosting services to cancel the registrations or to block access to particular sites.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C++, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A computer-implemented method for responding to a possible misappropriation of data on the Internet, the method comprising executing on a processor instructions including:

searching the Internet for potentially misappropriated data having a first data type determined by a first pattern;

for Internet sites found to contain the potentially misappropriated data:
   scraping the potentially misappropriated data from the sites and generating scraped data; and
   gathering supplemental data related to the potentially misappropriated data;
hashing a portion of the scraped data including the first data type and generating scraped hashed data, wherein the potentially misappropriated data comprises fewer bits than the number of bits comprising the scraped hashed data; and
based, at least in part, on the scraped hashed data and supplemental data, taking remedial action by transmitting a report including at least some of the scraped and supplemental data.

2. The computer-implemented method of claim 1, wherein searching the Internet further comprises searching sites on the surface web, on the deep web, and on the dark web.

3. The computer-implemented method of claim 1, wherein supplemental data are selected from the group consisting of: site metadata, Markup Language data, Secure Socket Layer data, a Domain Name System record, a site address, WHOIS data, and site data analytics.

4. The computer-implemented method of claim 1 wherein taking remedial action comprises taking an action selected from the group consisting of: requesting a takedown, resetting a credential, blocking account access, monitoring a financial account, and locking a financial account.

5. The computer implemented method of claim 1 further comprising:
   receiving from a user the potentially misappropriated data.

6. The computer-implemented method of claim 1, wherein the supplemental data includes one or more DNS records; and wherein the remedial action is further based on the one or more DNS records.

7. A computer-implemented method for responding to a possible misappropriation of data on the Internet, the method comprising executing on a processor instructions including:
   hashing potentially misappropriated data to generate potentially misappropriated hashed data, the potentially misappropriated data comprising fewer bits than the number of bits comprising the potentially misappropriated hashed data, wherein the potentially misappropriated data comprises a first data type determined by a first pattern corresponding to a first person's personal data;
   scraping data from the Internet and generating scraped data;
   hashing a portion of the scraped data including the first data type to generate scraped hashed data;
   first searching the scraped hashed data for the potentially misappropriated hashed data;
   if the potentially misappropriated hashed data are found:
      creating a variation of the potentially misappropriated data based on the personal data;
      generating a hashed variation of the potentially misappropriated data by hashing the variation of the potentially misappropriated data; and
   second searching the scraped hashed data for the hashed variation of the potentially misappropriated data; and
   based, at least in part, on results of the first and second searchings, taking remedial action.

8. The computer-implemented method of claim 7 wherein first and second searchings of the Internet comprise searching portions of the surface web, of the deep web, and of the dark web.

9. The computer-implemented method of claim 8 wherein taking remedial action comprises transmitting a report and wherein the report comprises an impact evaluation based, at least in part, on whether the potentially misappropriated data were found on the surface web, on the deep web, or on the dark web.

10. The computer-implemented method of claim 7 further comprising:
   receiving from a user the potentially misappropriated data;
   wherein the potentially misappropriated data are received in a cryptographically hashed form; and
   wherein creating a variation of the potentially misappropriated data comprises receiving a hashed variation of the possibly misappropriated data from the server.

11. The computer-implemented method of claim 7 wherein taking remedial action comprises transmitting a report including information based on results of the second searching of the Internet.

12. The computer-implemented method of claim 7 wherein creating a variation of the potentially misappropriated data comprises an element selected from the group consisting of: applying a fuzzy algorithm to the possibly misappropriated data and transforming the potentially misappropriated data in accordance with a known variation of a data pattern associated with the potentially misappropriated data.

13. The computer-implemented method of claim 7 wherein hashing the variation of the potentially misappropriated data further comprises using a plurality of hashing algorithms to generate a plurality of hashed variations of the potentially misappropriated data; and the second searching the scraped hashed data further comprises searching the plurality of hashed variations of the potentially misappropriated data.

14. A system for responding to a possible misappropriation of data on the Internet, the system comprising:
   a non-transitory memory;
   one or more processors coupled to the non-transitory memory and configured to execute instructions to perform operations comprising:
      searching the Internet for potentially misappropriated data having a first data type determined by a first pattern, the potentially misappropriated data having been selected from among a variety of potentially misappropriated data generated using at least one fuzzy algorithm;
      for Internet sites found to contain the potentially misappropriated data:
         scraping the potentially misappropriated data from the sites and generating scraped data; and
         gathering supplemental data related to the potentially misappropriated data;
      hashing a portion of the scraped data including the first data type and generating scraped hashed data, the potentially misappropriated data comprising fewer bits than the number of bits comprising the potentially misappropriated hashed data; and
      based, at least in part, on the scraped hashed data and supplemental data, taking remedial action by transmitting a report including at least some of the scraped and supplemental data.

15. The system of claim 14, wherein taking remedial action further comprises taking an action selected from the group consisting of: requesting a takedown, resetting a credential, blocking account access, monitoring a financial account, and locking a financial account.

16. The system of claim 14, wherein supplemental data are selected from the group consisting of: site metadata, Markup Language data, Secure Socket Layer data, a Domain Name System record, a site address, WHOIS data, and site data analytics.

17. The system of claim 14, wherein scraping potentially misappropriated data from the Internet comprise scraping portions of the surface web, of the deep web, and of the dark web.

18. The system of claim 17, wherein the report comprises an impact evaluation based, at least in part, on whether the potentially misappropriated data were found on the surface web, on the deep web, or on the dark web.

* * * * *